UNITED STATES PATENT OFFICE.

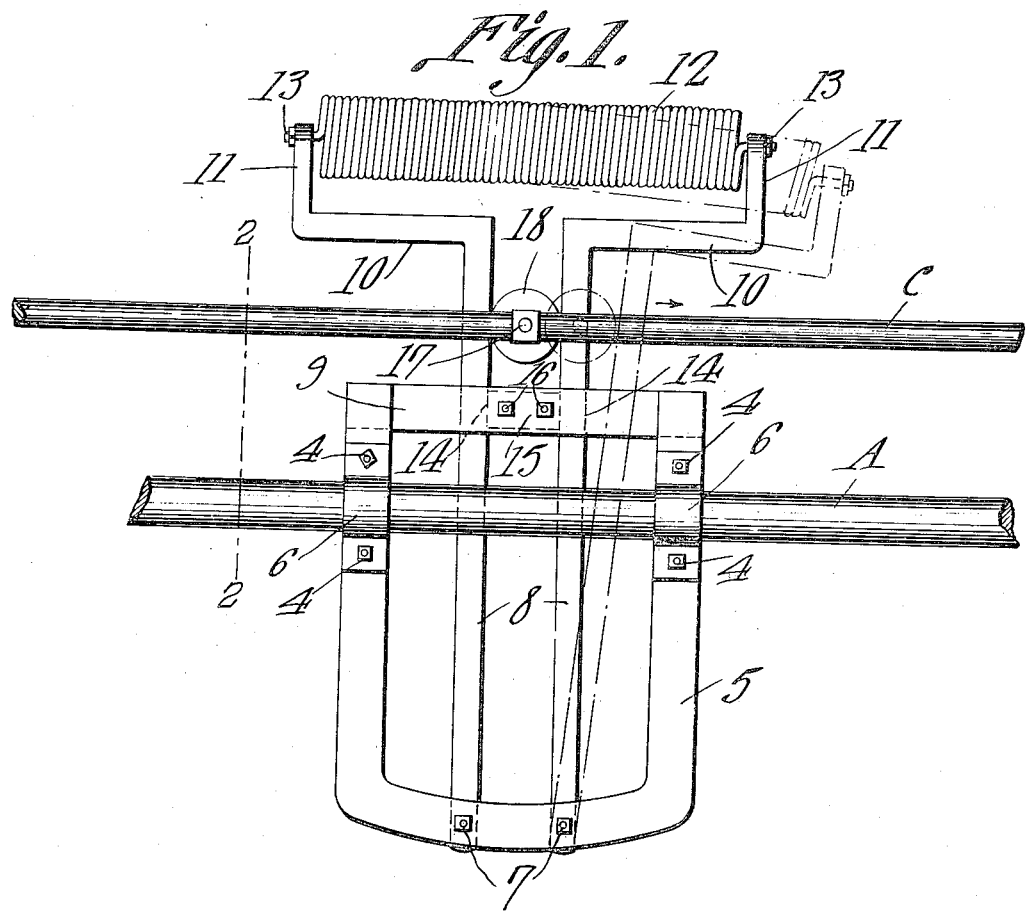
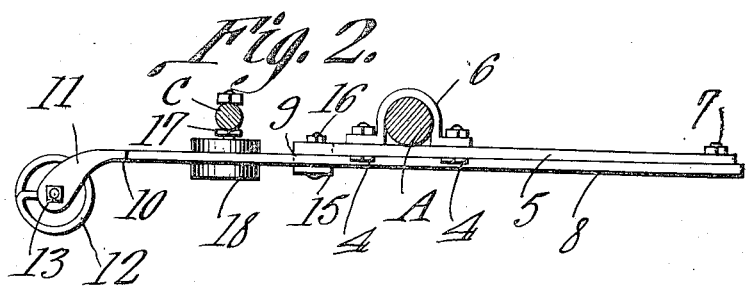

EDWARD H. DAVIS AND ELTON J. RHODES, OF SAN MARTIN, CALIFORNIA.

SAFETY STEERING DEVICE.

1,069,862.

Specification of Letters Patent.    Patented Aug. 12, 1913.

Application filed January 25, 1911.  Serial No. 604,664.

*To all whom it may concern:*

Be it known that we, EDWARD H. DAVIS and ELTON J. RHODES, citizens of the United States, residing at San Martin, in the county of Santa Clara, State of California, have invented a new and useful Safety Steering Device, of which the following is a specification.

The present invention appertains to steering mechanisms for motor vehicles, and aims primarily to provide an attachment for the front axle of the vehicle which will coöperate with the connecting rod for the steering wheels in order to yieldingly hold the connecting rod in neutral position, or in such a position that the vehicle will move in a straight line or forward, thus relieving the driver or chauffeur, to a great extent, of the duty of maintaining the steering wheel in such a position.

It is also the object of the present invention to provide an attachment of the character indicated which shall be simple, durable, substantial and inexpensive in construction, as well as efficient, convenient and serviceable in its use, and which shall be provided with means whereby the movement of the connecting rod may be limited, so as to limit the movement of the steering wheels about the axes of the knuckles to which they are connected, and means whereby the connecting rod may be permitted to work free, as usual.

To the above and other ends, the present invention resides in the novel construction, arrangement and combination of parts as hereinafter set forth and claimed, reference being had to the accompanying drawing, wherein the invention is illustrated in its preferred embodiment, and wherein:—

Figure 1 is a plan view of the attachment as applied to the axle and connecting rod of an automobile. Fig. 2 is a sectional view taken on the line 2—2 of Fig. 1.

Referring specifically to the drawing, the letter A designates the axle of an automobile, and C denotes the connecting rod of the steering wheels or the knuckles thereof, the said connecting rod serving to cause the wheels to turn in unison when turned to one side or the other by the operator by means of the steering wheel, as is well understood.

In carrying out the present invention there has been provided a rectangular frame 5, the sides of which are secured to the axle by means of a pair of clips 6. The clips embrace the axle and securing members 4 serve to attach the sides of the frame to the clips adjacent one end of the frame, so that the said end of the frame stands between the axle and the connecting rod. A pair of arms or levers 8 are pivoted or fulcrumed to the other end of the frame and project beyond the connecting rod, their free ends being offset, as designated by the numeral 11, to provide the diverging elbows 10. A contractile spring 12 has its extremities 13 secured through or to the offset ends of the arms 8 and is normally under considerable tension so as to hold the arms 8 together with considerable force. A stop in the form of a block or the like, designated 15, is secured to that end of the frame which stands between the axle and the connecting rod by means of bolts or other removable securing members 16, the said stop being disposed between the arms 8. Thus, the tension of the spring 12 will hold the arms 8 against the ends of the stop or block 15, the said stop and the respective securing members 4 serving to limit the oscillatory movements of the arms 8. A bolt or other member 17 is carried by the connecting rod and a roller 18 is mounted upon the said member and fits or projects between the arms 8.

The attachment and the various parts thereof are so arranged, that the tension of the arms 8 will tend to maintain the connecting rod in neutral position or in such a position that the steering wheel will cause the vehicle to move in a straight line. Then, as the steering mechanism is manipulated to turn the steering wheels to one side or the other, the connecting rod C will be moved in the direction to which the wheels are turned and will carry with it, the roller 18. The said roller will swing the arm 8 therewith, which lies in its path, the other arm engaging the stop 15 and being prevented from moving therewith, so that the spring 12 is brought under greater tension, or under accelerating tension as the wheels are turned farther. When the steering mechanism is released or free, the tension of the spring will return the arm which has been swung back to normal position or against the stop 15, so that the steering wheels will again be in straight line position. The contractile spring therefore serves or has the tendency to maintain the connecting rod in neutral position, but at the same time permits the connecting rod to yield in either direction for turning the steering wheels. The respective securing members 4 serve to limit the movement of the arms so that the connecting rod is limited in its movement, which will prevent the steering wheel from being turned excessively.

When it is desired to remove the tension from the connecting rod or the steering mechanism, the same may be accomplished in an easy and convenient manner, by detaching the stop 15 by removing the securing members 16, and the arms 8 will then be free, in which event, they will move with the roller without creating a tension upon the connecting rod. The connecting rod, however, will be limited in its movement by the securing members 4, as above stated.

From the foregoing, taken in connection with the drawing, the advantages of the present device will be apparent and it will be noted that the objects aimed at have been carried out satisfactory, the present device providing a desirable one for the purposes for which it is designed.

Having thus described the invention what is claimed as new is:—

1. In combination with a vehicle axle and a connecting rod for the steering wheels, a rectangular frame having its sides secured to the axle so that one end stands between the axle and connecting rod, a pair of arms pivoted to the other end of the frame and projecting beyond the connecting rod with their free ends offset, a contractile spring connecting the offset ends of the arms and normally under considerable tension, a stop removably secured to the former end of the frame between the arms and permitting the arms to swing free when removed, and a member carried by the connecting rod and standing between the said arms.

2. In combination with a vehicle axle and a connecting rod for the steering wheels, a rectangular frame, a pair of clips embracing the axle, securing members attaching the sides of the frame to the clips adjacent one end of the frame, so that the said end stands between the axle and connecting rod, a pair of arms pivoted to the other end of the frame and projecting beyond the connecting rod with their free ends offset, the respective aforesaid securing members serving as stops for the arms, a contractile spring connecting the offset ends of the arms and normally under considerable tension, a stop disposed between the arms, securing members attaching the stop to the former end of the frame and permitting its removal to allow the arms to swing free, and a roller carried by the connecting rod and projecting between the said arms.

In testimony that we claim the foregoing as our own, we have hereto affixed our signatures in the presence of two witnesses.

EDWARD H. DAVIS.
ELTON J. RHODES.

Witnesses:
Wm. T. Aggeler,
F. A. Schilling.